US010626855B2

(12) United States Patent
Melhus (10) Patent No.: US 10,626,855 B2
(45) Date of Patent: Apr. 21, 2020

(54) LIQUID LIFTING DEVICE

(71) Applicant: ENERGY HARVEST AS, Sørvågen (NO)

(72) Inventor: Trond Melhus, Sørvågen (NO)

(73) Assignee: ENERGY HARVEST AS, Sørvågen (NO)

( * ) Notice: Subject to any disclaimer, the term of this patent is extended or adjusted under 35 U.S.C. 154(b) by 150 days.

(21) Appl. No.: 15/766,448

(22) PCT Filed: Oct. 8, 2015

(86) PCT No.: PCT/EP2015/073298
§ 371 (c)(1),
(2) Date: Apr. 6, 2018

(87) PCT Pub. No.: WO2017/059918
PCT Pub. Date: Apr. 13, 2017

(65) Prior Publication Data
US 2018/0320671 A1 Nov. 8, 2018

(51) Int. Cl.
*F04B 9/113* (2006.01)
*F04B 23/02* (2006.01)
(Continued)

(52) U.S. Cl.
CPC .............. *F04B 9/113* (2013.01); *F04B 23/02* (2013.01); *F04B 23/106* (2013.01); *F04B 23/12* (2013.01);
(Continued)

(58) Field of Classification Search
CPC ........ F04B 23/02; F04B 23/106; F04B 23/12; F04B 47/00; F04B 9/113; F04F 13/00
See application file for complete search history.

(56) References Cited

U.S. PATENT DOCUMENTS 3,234,746 A * 2/1966 Cope .................. F17C 5/02
62/50.6
3,516,763 A 6/1970 Manton
(Continued)

FOREIGN PATENT DOCUMENTS

| JP | 2001-506916 A | 5/2001 | |
| WO | WO 2004/111452 A1 | 12/2004 | |
| WO | WO-2004111452 A1 * | 12/2004 | .............. F04B 9/113 |

OTHER PUBLICATIONS

International Search Report for related International Application No. PCT/EP2015/073298 dated May 27, 2016.
(Continued)

*Primary Examiner* — Dominick L Plakkoottam
(74) *Attorney, Agent, or Firm* — Renner, Otto, Boisselle & Sklar, LLP (57) ABSTRACT

Lifting device (10) for vertically lifting liquids, where the lifting device (10) comprises: a lifting line arrangement (18) for guiding a liquid from an open lower reservoir (16) to an upper reservoir (14); a lowering line arrangement (20) for guiding the liquid from the upper reservoir (14) to the lower reservoir (16); a pressure converter (12) with an actuating member (36), the pressure converter (12) being configured to convert a liquid pressure in the lowering line arrangement (20) into a liquid pressure in the lifting line arrangement (18) by means of a substantially linear movement of the actuating member (36); and a pump member (38) for pumping the liquid in the lifting line arrangement (18) towards the upper reservoir (14) and/or for pumping the liquid in the lowering line arrangement (20) towards the pressure converter (12).

20 Claims, 2 Drawing Sheets

(51) Int. Cl.
*F04F 13/00* (2009.01)
*F04B 23/10* (2006.01)
*F04B 23/12* (2006.01)
*F04B 47/00* (2006.01)
*A01K 63/04* (2006.01)

(52) U.S. Cl.
CPC .............. *F04B 47/00* (2013.01); *F04F 13/00* (2013.01); *A01K 63/047* (2013.01)

(56) References Cited

U.S. PATENT DOCUMENTS

| | | | |
|---|---|---|---|
| 5,564,912 A | 10/1996 | Peck et al. | |
| 6,203,696 B1* | 3/2001 | Pearson | B01D 61/06 |
| | | | 210/98 |
| 2002/0029689 A1* | 3/2002 | Pierce | A01D 34/64 |
| | | | 91/418 |
| 2002/0106291 A1 | 8/2002 | Young | |
| 2004/0055316 A1* | 3/2004 | Emmer | F17C 7/04 |
| | | | 62/50.6 |
| 2014/0299196 A1 | 10/2014 | Heng et al. | |

OTHER PUBLICATIONS

Official Action for corresponding Chinese Application No. 201580084609.4 dated Dec. 28, 2018 and its English translation.
Official Action for corresponding Chinese Application No. 201580084609.4 dated Aug. 2, 2019 and its partial English translation.
Official Action for corresponding Chilean Application No. 201800884 dated Jul. 24, 2019.
International Preliminary Report on Patentability for related International Application No. PCT/EP2015/073298 dated Apr. 10, 2018.
Official Action for corresponding Japanese Application No. 2018-537712 dated Oct. 1, 2019 and its English translation.

\* cited by examiner

LIQUID LIFTING DEVICE

TECHNICAL FIELD

The present disclosure generally relates to a lifting device for vertically lifting liquids. In particular, a lifting device for lifting a liquid from an open lower reservoir to an upper reservoir and for lowering the liquid from the upper reservoir back to the lower reservoir, and a system comprising the lifting device are provided.

BACKGROUND

In a wide range of applications, it is desired to elevate a liquid from a lower reservoir to a higher or upper reservoir which is vertically above the lower reservoir. One example of such application is an elevated reservoir for fish cultivation, where fresh water is supplied from a lower reservoir to the elevated reservoir and old water is drained from the elevated reservoir back to the lower reservoir. Further applications include cooling installations for power production, process industry, oil rigs, ships and similar.

US 2014/299196 A1 discloses a water lifting system, in particular a fire extinguishing system for offshore installations, comprising a pump-turbine assembly with a pump unit and a turbine unit. The pump unit has an intake port below the sea level and and a discharge port connected to a pump via a first line. A second line leads from the pump to a first distribution device on the offshore installation. A fourth line connects the first distribution device to the turbine unit.

The water lifting system in US 2014/299196 A1 has a complicated and expensive design. Moreover, the system causes high losses and the efficiency is consequently low.

SUMMARY

Accordingly, one object of the present disclosure is to provide a lifting device for elevating liquids with a simple and reliable structure and with a high efficiency.

According to one aspect, a lifting device for vertically lifting liquids is provided, where the lifting device comprises a lifting line arrangement for guiding a liquid from an open lower reservoir to an upper reservoir, a lowering line arrangement for guiding the liquid from the upper reservoir to the lower reservoir, a pressure converter with an actuating member, the pressure converter being configured to convert a liquid pressure in the lowering line arrangement into a liquid pressure in the lifting line arrangement by means of a substantially linear movement of the actuating member and a pump member for pumping the liquid in the lifting line arrangement towards the upper reservoir and/or for pumping the liquid in the lowering line arrangement towards the pressure converter.

The lifting device thus allows liquid (e.g. water) to be circulated in a continuous loop formed by the lower reservoir, the lifting line arrangement, the upper reservoir and the lowering line arrangement. The liquid thereby returns to the lower reservoir from which it has been originally pumped. Thus, within the present disclosure, the lower reservoir may be constituted by one single reservoir.

However, it is possible that the lower reservoir is constituted by two reservoirs, e.g. a first lower reservoir and a second lower reservoir. The second lower reservoir may be below the first lower reservoir. In this case, the lifting line arrangement may be configured to guide a liquid from the first lower reservoir to the upper reservoir and the lowering line arrangement may be configured to guide the liquid from the upper reservoir to the second lower reservoir. Both the first lower reservoir and the second lower reservoir may be open to the surrounding atmosphere.

The weight of the liquid head inside the lowering line arrangement above the pressure converter imposes a static force on the actuating member. Due to this gravital force, the actuating member is forced to move to impose a corresponding upwardly directed pressure on the liquid in the lifting line arrangement. The dimensioning of the pump member can therefore be reduced, e.g. merely dimensioned to overcome frictional losses between the liquid and the insides of the lifting/lowering line arrangements. Since potential energy of the liquid in the lowering line arrangement is "collected" and used to pump the liquid in the lifting line arrangement upwardly towards the upper reservoir, the lifting device resembles a U-pipe even when being used with an open lower reservoir. The lifting device thereby also functions as an energy recovery apparatus or an energy harvester.

The pump member may be a conventional pump and/or may be driven electrically. The pump member is preferably constituted by a volumetric pump, such as a lobe pump. A lobe pump is easier to control in dependence of flow rate and pressure differences, especially if it is controlled by a frequency controller.

With a volumetric pump, a lower rotational speed can be used and the pumped liquid has a more laminar flow in comparison with, for example, a centrifugal pump. Moreover, a centrifugal pump generates gas bubbles in the pumped liquid which can be harmful to fish in a cultivation tank since the bubbles adhere to the gills. When the saturation level of gas bubbles (typically nitrogen) reaches a certain threshold, the fish might die.

The actuating member constitutes a mechanical or hydraulic force transmitter between the lowering line arrangement and the lifting line arrangement. No substantial fluid communication takes place between the lifting line arrangement and the lowering line arrangement through the pressure converter.

Throughout the present disclosure, a higher or upper reservoir is positioned at a higher elevation than the lower reservoir. The vertical liquid lifting includes a vertical component but does not have to be carried out in the vertical direction only. For example, each of the lifting line arrangement and the lowering line arrangement may include one or several flow line sections with arbitrary directions as long as the lower reservoir and the pressure converter are vertically below the upper reservoir.

The upper reservoir may or may not be open to the surrounding atmosphere. In other words, the upper reservoir may be either open or closed. The upper reservoir may be constituted by an open or closed tank. Alternatively, the upper reservoir may be constituted by a piping system between the lifting line arrangement and the lowering line arrangement.

According to one variant, the lifting line arrangement is configured to guide the liquid from the lower reservoir to a heat exchanger and the lowering line arrangement is configured to guide the liquid from the heat exchanger to the lower reservoir. For example, a cooling circuit with fresh water may be cooled by means of salt water lifted from the sea (constituting the lower reservoir) by the lifting device.

In case the upper reservoir is closed (e.g. constituted by a piping system or a closed tank, such as a closed fish cultivation tank), a siphon effect may be accomplished with the lifting device. The siphon effect may be accomplished by positioning an outlet (e.g. a lower end of a lower drain conduit) of the lowering line arrangement at a vertical position below the surface level of the lower reservoir from which the liquid is guided to the upper reservoir.

For example, in case the lower reservoir is constituted by a first lower reservoir and a second lower reservoir below the first lower reservoir, an inlet of the lifting line arrangement may be submerged in the first lower reservoir and an outlet of the lowering line arrangement may be positioned above, or be submerged in, the second lower reservoir. The siphon effect then depends on the vertical distance between the surface level of the first lower reservoir and the outlet of the lowering line arrangement. This vertical distance may for example be 8-12 meters, such as 10 meters.

In this manner, the additional weight of the liquid in the lowering line arrangement (that generates the siphon effect) can be used to reduce the need for a pump member, e.g. a pump on the lifting line arrangement between the pressure converter and the upper reservoir can be eliminated. In case the pump member is integrated with or constituted by the pressure converter, the pump member may be driven only by the gravital force of the liquid in the lowering line arrangement.

Furthermore, in case the upper reservoir is closed (e.g. constituted by a tank, a piping system, a heat exchanger or another closed system), the upper reservoir may be configured to store pressure energy in the liquid. If the liquid pressure within the upper reservoir is increased, this additional pressure or overpressure may be released and led to the pressure converter by the lowering line arrangement.

Such additional liquid pressure in the upper reservoir may stem from a variety of sources. For example, the liquid pressure in the upper reservoir may be increased by the pump member, an external pressure source or by temperature changes in the liquid.

In order to store liquid pressure in the upper reservoir, the upper reservoir may constitute, comprise or be coupled to an accumulator. The accumulator may include a bellows arranged to expand and contract in dependence of the liquid pressure.

With an open lower reservoir is meant a reservoir that is open to the surrounding atmosphere. The lower reservoir may for example be constituted by a tank, the sea or a lake. In case the lower reservoir is constituted by a first lower reservoir and a second lower reservoir, each reservoir may be constituted by a tank. Alternatively, the first lower reservoir may be constituted by a tank and the second lower reservoir may be constituted by the sea or a lake. Also two naturally existing and vertically displaced liquid sources may be used as the first lower reservoir and the second lower reservoir.

The lifting line arrangement may comprise a conduit arrangement for guiding the liquid from the pressure converter to the upper reservoir. The lifting line arrangement may or may not comprise a conduit arrangement between the lower reservoir and the pressure converter. Similarly, the lowering line arrangement may comprise a conduit arrangement for guiding the liquid from the upper reservoir to the pressure converter and the lowering line arrangement may or may not comprise a conduit arrangement between the pressure converter and the lower reservoir.

For example, the pressure converter may be submerged in the lower reservoir. In this case, conduit arrangements for supplying/draining liquid between the lower reservoir and the pressure converter may be dispensed with. The pressure converter may merely be provided with suitable openings (e.g. inlets and outlets) for communicating with the lower reservoir.

The pressure converter may be configured to continuously convert a liquid pressure in the lowering line arrangement into a liquid pressure in the lifting line arrangement. The actuating member may for example be configured to reciprocate continuously.

The pressure converter may comprise two hollow bodies and two piston members, each being movable within a respective hollow body in order to sealingly divide each hollow body into two chambers of variable volumes, wherein the actuating member is configured to translate a movement of one piston member to a movement of the other piston member.

The piston members may be constituted by conventional pistons, i.e. rigid pistons slidably arranged with respect to the interior surfaces of the respective hollow bodies. Alternatively, one or both of the piston members may be constituted by a flexible piston member (e.g. a membrane) with its periphery fixedly attached to the interior surface of the respective hollow body. Such flexible members may thus move by flexing back and forth as the actuating member moves (this applies both for a mechanical and a hydraulic actuating member). The flexible members may additionally be stretchable.

The two hollow bodies may be constituted by a tubular member with a partition wall. According to one variant, the tubular member is a cylinder with a partition wall dividing the interior space of the tubular member to form the two hollow bodies. The tubular member thus constitutes a housing. Alternatively, the two hollow bodies may be constituted by two separate housings, e.g. distanced from each other.

Although the pressure converter is mainly exemplified as comprising two hollow bodies within the present disclosure, the pressure converter may also be constituted by one double-acting cylinder. In this case, the lifting line arrangement may be connected to a first chamber of the double-acting cylinder and the lowering line arrangement may be connected to a second chamber, on the opposite side of the piston, of the double-acting cylinder.

The lifting device may further comprise an inlet three-way valve in the lowering line arrangement configured to alternatingly supply the liquid from the upper reservoir into the chambers of one hollow body. In other words, the inlet three-way valve can alternatingly adopt a first state where a first conduit to a first chamber is open and a second conduit to a second chamber is closed and a second state where the first conduit is closed and the second conduit is open. The inlet three-way valve may be of any suitable type. The alternating supply of the liquid from the upper reservoir to the respective chambers may alternatively be controlled by a valve arrangement other than a three-way valve.

According to one variant, the inlet three-way valve is electronically controlled to switch the supply. This may for example be realized by electronically controlling the inlet three-way valve based on end positions of the actuating member detected by two end position sensors. However, it is also conceivable to realize the alternating supply of the inlet three-way valve purely mechanically.

The lifting device may further comprise an outlet three-way valve in the lowering line arrangement below the pressure converter configured to alternatingly drain liquid from the chambers of one hollow body to the lower reservoir. The outlet three-way valve may be of any suitable type. Also the outlet three-way valve may be electronically controlled to switch the draining, for example based on the same two end position sensors as mentioned above. However, also the alternating draining of the outlet three-way valve may alternatively be accomplished purely mechanically. The outlet three-way valve may be configured to drain liquid from a chamber to which liquid is not currently supplied by the inlet three-way valve.

The lifting line arrangement may further comprise an inlet and an outlet associated with each chamber of one hollow body and a one-way valve associated with each inlet and outlet. Thus, in one variant, four one-way valves are provided in the lifting line arrangement. The one-way valves serve to prevent liquid in the lifting line arrangement from returning to the lower reservoir and from returning to the pressure converter, respectively. Each one-way valve may be constituted by a conventional check valve that opens when a threshold pressure is reached. Also these valves can be implemented with standard, controllable valves of known type, preferably synchronized with the inlet three-way valve and/or the outlet three-way valve.

The actuating member may be constituted by a piston rod interconnecting the two piston members. The two piston members may for example be attached to the respective ends of the piston rod. The two hollow bodies may be provided with appropriate sealing arrangements that seal the hollow bodies to the exterior during movement of the actuating member. The piston rod may additionally extend through the respective outer sides of the hollow bodies, e.g. entirely through the pressure converter. Thus, the piston rod may extend from both sides of the respective piston member. Thereby, the effective areas (the area of the piston member minus the area of the piston rod) on the two sides of the respective piston members may be equal.

The actuating member according to the present disclosure may be configured to allow a compression and expansion (with respect to a neutral state) in the direction of movement. This may be realized by providing a spring mechanism on or within the actuating member. In case the actuating member interconnects two piston members, a pressure increase within one of the chambers can be transmitted to a pressure increase within the other chamber with a certain time delay. The time delay depends on the characteristics of the spring mechanism. With this solution, problems with inertia, hysteresis and/or timing performance of the valves can be reduced or eliminated.

The pump member may be integrated with the pressure converter and configured to pump liquid by driving the actuating member. In case the actuating member is constituted by a piston rod, the pump member may comprise a drive mechanism configured to reciprocally drive the piston rod. The drive mechanism may be constituted by at least one gear wheel driving the actuating member by engaging corresponding teeth on the actuating member.

The drive of the piston rod in this manner may be carried out between the two hollow bodies. However, this drive may also be carried out on a piston rod extending out from one hollow body at a side opposite to the other hollow body.

The pump member may be arranged in the lifting line arrangement between the pressure converter and the upper reservoir or between the lower reservoir and the pressure converter. With these two variants, the pump member can be arranged to pump the liquid upwards towards the upper reservoir. As an alternative, the pump member may be arranged in the lowering line arrangement between the upper reservoir and the pressure converter. With this variant, the pump member can be arranged to pump the liquid downwards towards the pressure converter and thereby add to the force of the liquid inside the lowering line arrangement acting on the actuating member.

According to a further aspect, there is provided a system comprising a lifting device, an upper reservoir and/or a lower reservoir, each according to the present disclosure. The lifting device may be used with a variety of liquids including natural water and more viscous liquids such as slurry. The upper reservoir may be closed to the surrounding atmosphere. The upper reservoir may additionally be configured to store pressure energy in the liquid.

The system may comprise an additional source of liquid, e.g. a third source in addition to the lower reservoir and the upper reservoir. The third source may supply liquid into the upper reservoir. Alternatively, or in addition, the third source may supply liquid to the lowering line arrangement, for example by connecting to an upper drain conduit receiving liquid from the upper reservoir. In this manner, additional hydrostatic work by the liquid from the third source may be transformed to work by the actuating member which functions as a pump member. Consequently, the work required by the pump member can be reduced or a pump member outside the pressure converter can be eliminated. In case the pressure converter comprises two hollow bodies and two piston members, the area of the piston member within the hollow body in communication with the lowering line arrangement may be larger than the area of the piston member within the hollow body in communication with the lifting line arrangement.

According to a further aspect, there is provided a system comprising a lifting device, a heat exchanger and/or a lower reservoir.

BRIEF DESCRIPTION OF THE DRAWINGS

Further details, advantages and aspects of the present disclosure will become apparent from the following embodiments taken in conjunction with the drawings, wherein.

DETAILED DESCRIPTION

In the following, a lifting device for lifting a liquid from an open lower reservoir to an upper reservoir and for lowering the liquid from the upper reservoir back to the lower reservoir, and a system comprising the lifting device will be described. The same reference numerals will be used to denote the same or similar structural features.

Figure 1:
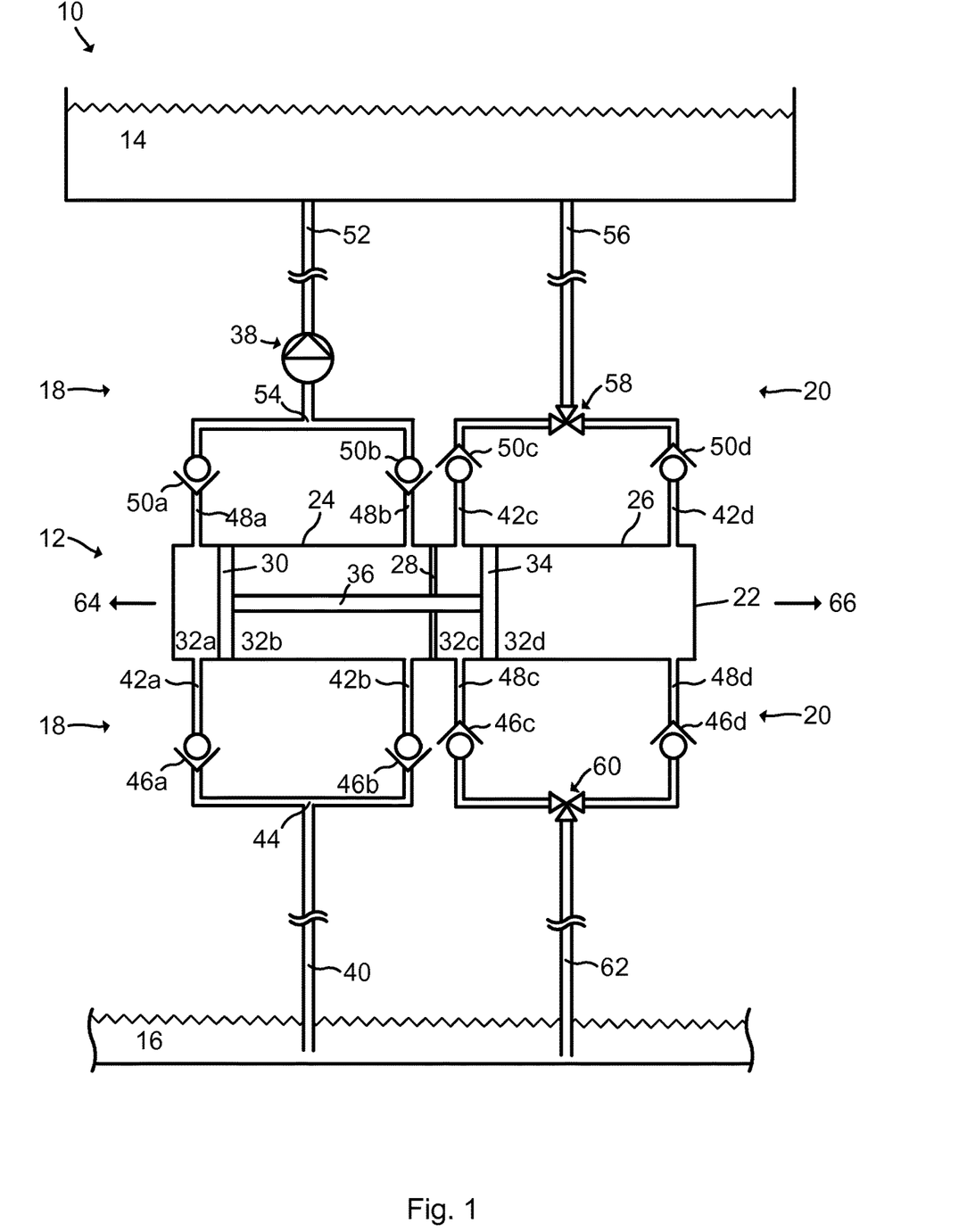
FIG. 1: schematically represents a lifting device with a pressure converter in operation with an upper reservoir and a lower reservoir.

FIG. 1 schematically represents a lifting device 10 with a pressure converter 12 in operation with an upper reservoir 14 and a lower reservoir 16. FIG. 1 thus also shows a system comprising the lifting device 10, the upper reservoir 14 and the lower reservoir 16.

The upper reservoir 14 is positioned at a higher elevation than the lower reservoir 16, for example 20 meters above the lower reservoir 16. Both the upper reservoir 14 and the lower reservoir 16 are open to the surrounding atmosphere. In FIG. 1, the upper reservoir 14 is a tank and the lower reservoir 16 is a lake.

The lifting device 10 comprises a lifting line arrangement and a lowering line arrangement, generally designated by reference numerals 18 and 20, respectively. As can be seen in FIG. 1, the lifting line arrangement 18 is configured to guide a liquid from the lower reservoir 16 to the pressure converter 12 and to guide the liquid from the pressure converter 12 to the upper reservoir 14. The lowering line arrangement 20 is configured to guide a liquid from the upper reservoir 14 to the pressure converter 12 and to guide the liquid from the pressure converter 12 back to the lower reservoir 16.

The pressure converter 12 in FIG. 1 comprises a tubular member 22 in the form of a cylinder. The tubular member 22 is divided into two hollow bodies 24, 26 by means of a partition wall 28. The two hollow bodies 24, 26 are integrally formed in FIG. 1. The hollow body 24 in connection with the lifting line arrangement 18 is referred to as a lifting hollow body 24 and the hollow body 26 in connection with the lowering line arrangement 20 is referred to as a lowering hollow body 26.

A piston member 30 is slidably arranged inside the lifting hollow body 24 and thereby divides the lifting hollow body 24 into a left lifting chamber 32a and a right lifting chamber 32b of variable volumes. Similarly, a piston member 34 is slidably arranged inside the lowering hollow body 26 and thereby divides the lowering hollow body 26 into a left lowering chamber 32c and a right lowering chamber 32d. The piston members 30, 34 may be provided with sealing rings as necessary in order to maintain a fluid tight seal between the lifting chambers 32a, 32b and between the lowering chambers 32c, 32d. In FIG. 1, the piston members 30, 34 are constituted by conventional pistons, i.e. rigid pistons slidably arranged with respect to the interior surfaces of the respective hollow bodies 24, 26.

An actuating member 36, here implemented as a piston rod, interconnects the piston members 30, 34. The piston members 30, 34 are attached to the respective ends of the actuating member 36. The actuating member 36 and the piston members 30, 34 are arranged to move as a unit with respect to the hollow bodies 24, 26. In other words, the actuating member 36 is configured to translate a movement of one piston member 34 to a movement of the other piston member 30. The tubular member 22 constitutes a housing for the piston members 30, 34 and the actuating member 36.

The actuating member 36 is arranged to move substantially linearly through an opening in the partition wall 28. A sealing is provided in this opening in order to avoid fluid communication between the hollow bodies 24, 26.

The lifting device 10 further comprises a pump member 38. The pump member 38 is arranged to pump liquid in the lifting line arrangement 18 upwards towards the upper reservoir 14. The pump member 38 is constituted by a conventional pump, preferably a volumetric pump such as a lobe pump, and is driven electrically.

In FIG. 1, the pump member 38 is positioned in the lifting line arrangement 18 between the pressure converter 12 and the upper reservoir 14. However, the pump member 38 may alternatively be positioned in the lifting line arrangement 18 between the lower reservoir 16 and the pressure converter 12 to pump the liquid towards the pressure converter 12 or be positioned in the lowering line arrangement 20 between the upper reservoir 14 and the pressure converter 12 to pump the liquid towards the pressure converter 12.

The particular layouts of the lifting line arrangement 18 and the lowering line arrangement 20 will now be described in more detail. The lifting line arrangement 18 comprises a lower supply conduit 40 with a lower end submerged in the lower reservoir 16. The lower supply conduit 40 branches into two inlets in the form of two inlet conduits 42a, 42b at a junction 44. The left inlet conduit 42a is connected to (associated with) the left lifting chamber 32a and the right inlet conduit 42b is connected to the right lifting chamber 32b.

A one-way valve 46a is provided on the left inlet conduit 42a and a one-way valve 46b is provided on the right inlet conduit 42b. The one-way valves 46a, 46b allow liquid to pass from the lower reservoir 16 to the lifting hollow body 24 of the pressure converter 12, but prevents liquid from passing in the opposite direction.

The lifting line arrangement 18 further comprises an left outlet in the form of a left outlet conduit 48a connected to the left lifting chamber 32a and a right outlet in the form of a right outlet conduit 48b connected to the right lifting chamber 32b. A one-way valve 50a is provided on the left outlet conduit 48a and a one-way valve 50b is provided on the right outlet conduit 48b. The left outlet conduit 48a and the right outlet conduit 48b branch together to an upper supply conduit 52 at junction 54. As can be seen in FIG. 1, the pump member 38 is provided on the upper supply conduit 52. The upper supply conduit 52 is connected to the upper reservoir 14 for releasing the lifted liquid thereinto.

The lifting line arrangement 18 thus provides two alternative flow paths for the liquid from the lower reservoir 16 to the upper reservoir 14. The first flow path is constituted by a conduit arrangement including the lower supply conduit 40, the left inlet conduit 42a, the left lifting chamber 32a, the left outlet conduit 48a and the upper supply conduit 52. The second flow path is constituted by a conduit arrangement including the lower supply conduit 40, the right inlet conduit 42b, the right lifting chamber 32b, the right outlet conduit 48b and the upper supply conduit 52.

The lowering line arrangement 20 comprises an upper drain conduit 56 connected to the upper reservoir 14 for receiving liquid therefrom. The lowering line arrangement 20 further comprises an inlet three-way valve 58 connecting the upper drain conduit 56, a left inlet in the form of a left inlet conduit 42c and a right inlet in the form of a right inlet conduit 42d. The left inlet conduit 42c is connected to the left lowering chamber 32c and the right inlet conduit 42d is connected to the right lowering chamber 32d. The lowering line arrangement 20 further comprises a left outlet in the form of a left outlet conduit 48c connected to the left lowering chamber 32c and a right outlet in the form of a right outlet conduit 48d connected to the right lowering chamber 32d.

The inlet three-way valve 58 can be positioned in either a first state, where liquid is led from the upper drain conduit 56 to the left inlet conduit 42c and where liquid from the upper drain conduit 56 is prevented from entering the right inlet conduit 42d, or in a second state, where liquid is led from the upper drain conduit 56 to the right inlet conduit 42d and where liquid from the upper drain conduit 56 is prevented from entering the left inlet conduit 42c. The inlet three-way valve 58 is thus configured to alternatingly supply the liquid from the upper reservoir 14 into the lowering chambers 32c, 32d of the lowering hollow body 26.

In FIG. 1, one-way valves 50c, 50d are provided on the left inlet conduit 42c and the right inlet conduit 42d, respectively, and one-way valves 46c, 46d are provided on the left outlet conduit 48c and the right outlet conduit 48d, respectively. However, the one-way valves 50c, 50d, 46c, 46d may optionally be omitted.

An outlet three-way valve 60 connects the left outlet conduit 48c, the right outlet conduit 48d and a lower drain conduit 62. The outlet three-way valve 60 has a structural configuration similar to the inlet three-way valve 58, i.e. the outlet three-way valve 60 can be positioned in either a first state, where liquid is led from the left outlet conduit 48c to the lower drain conduit 62 and where liquid from the right outlet conduit 48d is prevented from entering the lower drain conduit 62, or in a second state, where liquid is led from the right outlet conduit 48d to the lower drain conduit 62 and where liquid from the left outlet conduit 48c is prevented from entering the lower drain conduit 62.

The lower drain conduit 62 in FIG. 1 comprises a lower end submerged in the lower reservoir 16 for releasing the lowered liquid. However, the lower end of the lower drain conduit 62 may be positioned above the surface of the lower reservoir 16 and does not need to be submerged in the lower reservoir 16.

The outlet three-way valve 60 is thus configured to alternatingly drain liquid from the lowering chambers 32c, 32d of the lowering hollow body 26 to the lower reservoir 16. In this variant, the outlet three-way valve 60 is configured to drain liquid from a lowering chamber 32c, 32d to which liquid is not currently supplied by the inlet three-way valve 58.

Two end position sensors (not shown) are provided at the ends of the lowering hollow body 26 for detecting respective end positions of the piston member 34. The inlet three-way valve 58 is electronically controlled to switch into the first state when the piston member 34 is at, or close to, the left end of the lowering hollow body 26 and to switch into the second state when the piston member 34 is at, or close to, the right end of the lowering hollow body 26.

Also the outlet three-way valve 60 is electronically controlled based on the end position sensors. The outlet three-way valve 60 is electronically controlled to switch into the first state when the piston member 34 is at, or close to, the right end of the lowering hollow body 26 and to switch into the second state when the piston member 34 is at, or close to, the left end of the lowering hollow body 26.

The lowering line arrangement 20 thus provides two alternative flow paths for the liquid from the upper reservoir 14 to the lower reservoir 16. The first flow path is constituted by a conduit arrangement including the upper drain conduit 56, the left inlet conduit 42c, the left lowering chamber 32c, the left outlet conduit 48c and the lower drain conduit 62. The second flow path is constituted by a conduit arrangement including the upper drain conduit 56, the right inlet conduit 42d, the right lowering chamber 32d, the right outlet conduit 48d and the lower drain conduit 62. However, when the inlet three-way valve 58 and the outlet three-way valve 60 operates as described above, i.e. when the inlet three-way valve 58 adopts the first state at the same time as the outlet three-way valve 60 adopts the second state (and vice versa), these two flow paths are always temporarily closed at one point. All conduits in FIG. 1 may for example be constituted by rigid pipes, flexible hoses or any combinations thereof, i.e. any suitable types of flow lines for lifting and lowering the liquid.

An operation of the lifting device 10 in FIG. 1 will now be described. By positioning the inlet three-way valve 58 in the second state and by positioning the outlet three-way valve 60 in the first state, liquid from the upper reservoir 14 is led through the upper drain conduit 56, through the right inlet conduit 42d and into the right lowering chamber 32d while liquid inside the right outlet conduit 48d is prevented from entering the lower drain conduit 62 by means of the outlet three-way valve 60 adopting the second state.

The weight of the liquid inside the upper drain conduit 56 and the right inlet conduit 42d thereby imposes a static force on the right side of the piston member 34. This force causes the actuating member 36 to move to the left within the lowering hollow body 26, in the direction indicated by arrow 64 (a substantially horizontal direction in FIG. 1). During movement of the piston member 34 to the left, the right lowering chamber 32d will expand and more liquid from the upper reservoir 14 will be led into the right lowering chamber 32d. At the same time, liquid inside the left lowering chamber 32c will be forced out from the left lowering chamber 32c, through the left outlet conduit 48c, through the lower drain conduit 62 and into the lower reservoir 16 (liquid from the left lowering chamber 32c will not pass through the left inlet conduit 42c due to the one-way valve 50c and due to the inlet three-way valve 58 adopting the second state).

Simultaneously, i.e. when the actuating member 36 moves to the left in the direction 64, the piston member 30 is forced to the left within the lifting hollow body 24. As a consequence, a pressure is established inside the left lifting chamber 32a due to its compression, where the pressure substantially corresponds to the pressure inside the right lowering chamber 32d. Hence, the pressure converter 12 is configured to convert a liquid pressure in the lowering line arrangement 20 into a liquid pressure in the lifting line arrangement 18 by means of a substantially linear movement of the actuating member 36. Moreover, the actuating member 36 is made to constitute a mechanical force transmitter between the lowering line arrangement 20 and the lifting line arrangement 18.

The increased liquid pressure inside the left lifting chamber 32a forces the liquid out through the left outlet conduit 48a by opening the one-way valve 50a, through the upper supply conduit 52 and into the upper reservoir 14. The liquid flow in the upper supply conduit 52 is given sufficient additional force to overcome the frictional losses in the lifting device 10 by means of the pump member 38. The one-way valve 50b prevents liquid pumped out from the left lifting chamber 32a from entering the right lifting chamber 32b. The one-way valve 46a also prevents liquid in the left lifting chamber 32a from entering the lower supply conduit 40.

As the actuating member 36 moves to the left in the direction 64, the right lifting chamber 32b expands and sucks liquid from the lower reservoir 16 via the lower supply conduit 40 and the right inlet conduit 42b by opening the one-way valve 46b.

When the piston members 30, 34 have reached a left end position (which may or may not be at the very end of the respective hollow body 24, 26), the inlet three-way valve 58 is switched to the first state and the outlet three-way valve 60 is switched to the second state. Since the weight of the liquid in the upper drain conduit 56 and in the left inlet conduit 42c now imposes a static force on the left side of the piston member 34, a reverse movement of the actuating member 36 to the right, as indicated by arrow 66, is initiated.

During movement of the actuating member 36 to the right in the direction 66, liquid is sucked from the lower reservoir 16, through the lower supply conduit 40, through the left inlet conduit 42a by opening the one-way valve 46a and into the left lifting chamber 32a which expands by the movement of the actuating member 36. Simultaneously, the right lifting chamber 32b is compressed and the liquid inside is forced out through the right outlet conduit 48b by opening the one-way valve 50b, through the upper supply conduit 52 and into the upper reservoir 14. The pump member 38 operates continuously and also provides additional force to the liquid in the upper supply conduit 52 when the actuating member 36 moves in this reverse direction 66.

Simultaneously, i.e. when the actuating member 36 moves to the right in the direction 66, the piston member 34 is moved to the right due to the weight of the liquid from the upper reservoir 14 acting inside the left lowering chamber 32c and thereby the right lowering chamber 32d is drained. Thus, the compression of the right lowering chamber 32d pushes the liquid thereinside through the right outlet conduit 48d, through the lower drain conduit 62 and into the lower reservoir 16. However, the gravity of the liquid inside the right lowering chamber 32d, the right outlet conduit 48d and the lower drain conduit 62 will also help pulling the actuating member 36 to the right, i.e. in the direction 66.

When the piston members 30, 34 have reached a right end position (which may or may not be at the very end of the respective hollow body 24, 26), the inlet three-way valve 58 is again switched to the second state and the outlet three-way valve 60 is again switched to the first state and the above described procedure, where the actuating member 36 moves to the left in the direction 64, is repeated.

The lifting device 10 thus allows liquid to be circulated in a continuous loop formed by the lower reservoir 16, the lifting line arrangement 18, the upper reservoir 14 and the lowering line arrangement 20. The liquid thereby returns to the lower reservoir 16 from which it has been originally pumped. Due to the switching of the inlet three-way valve 58 and the outlet three-way valve 60, the pressure converter 12 is configured to continuously convert a liquid pressure in the lowering line arrangement 20 into a liquid pressure in the lifting line arrangement 18. The pressure converter 12 and the actuating member 36 have a simple and reliable structural configuration.

Figure 2A:
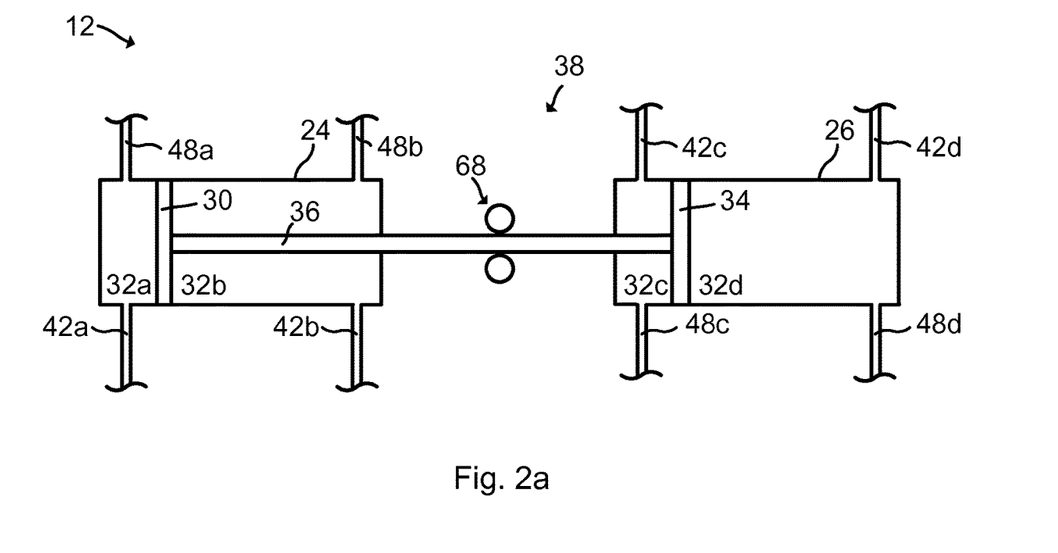
FIG. 2a: schematically represents an alternative pressure converter.

FIG. 2a schematically represents an alternative pressure converter 12. Mainly differences with respect to FIG. 1 will be described.

In FIG. 2a, the lifting bodies 24, 26 are separated from each other and the actuating member 36 (still in the form of a piston rod) interconnecting the piston members 30, 34 is elongated. A drive mechanism 68 in the form of at least one gear wheel (two gear wheels in FIG. 2a) drives the actuating member 36 in the reciprocating linear movement by engaging corresponding teeth (not shown) on the actuating member 36. The drive mechanism 68 thereby constitutes a pump member 38 integrated with the pressure converter 12. The drive mechanism 68 may thus replace or complement the previously described pump member 38.

Although the drive mechanism 68 is provided between the hollow bodies 24, 26, the drive mechanism 68 may alternatively be provided at the outside of one of the hollow bodies 24, 26. This may for example be accomplished by extending the actuating member 36 through one of the piston members 30, 34 and through an end wall of one of the hollow bodies 24, 26. In case this variant is implemented, the hollow bodies 24, 26 may still be integrally formed, as illustrated in FIG. 1.

Figure 2B:
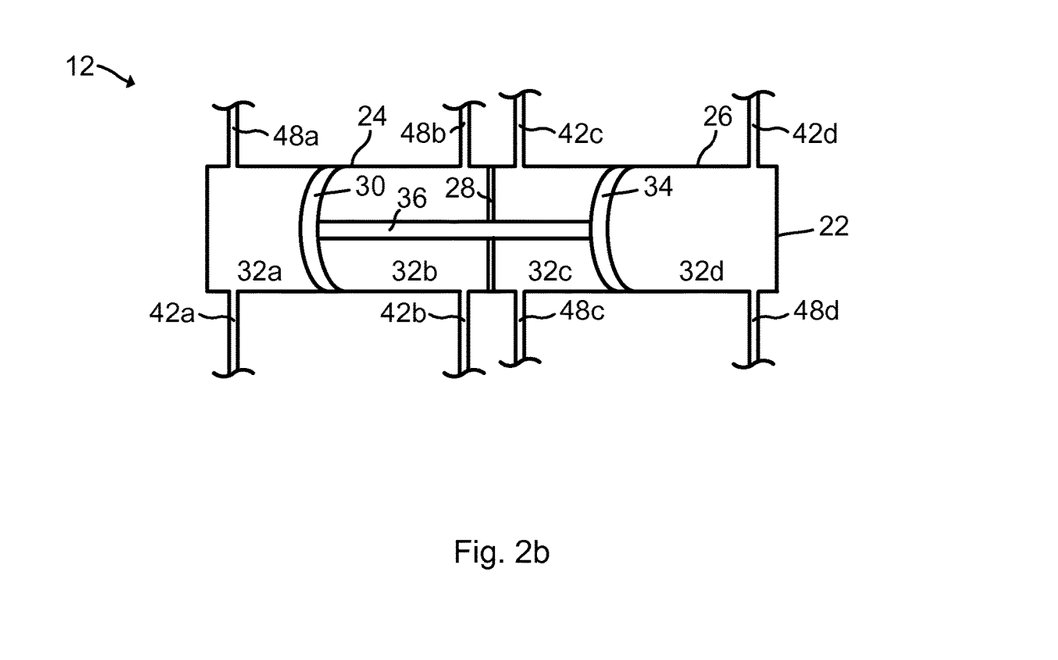
FIG. 2b: schematically represents a further alternative pressure converter.

FIG. 2b schematically represents a further alternative pressure converter 12. Mainly differences with respect to FIGS. 1 and 2a will be described.

In FIG. 2b, each piston member 30, 34 is constituted by a flexible piston member, here in the form of a membrane. The peripheries of the piston members 30, 34 are fixedly attached to the interior surface of the respective hollow bodies 24, 26. Due to the flexibility of these piston members 30, 34, the actuating member 36 may still reciprocate to vary the volumes of the chambers 32a, 32b, 32c, 32d as described above.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A lifting device for vertically lifting liquids, the lifting device comprising:
   a lifting line arrangement configured to guide liquid in an open lower reservoir from the open lower reservoir to an upper reservoir;
   a lowering line arrangement configured to guide liquid in the upper reservoir from the upper reservoir to the lower reservoir;
   a pressure converter with an actuating member, the pressure converter being configured to convert a liquid pressure in the lowering line arrangement into a liquid pressure in the lifting line arrangement by means of a substantially linear movement of the actuating member; and
   a pump member for pumping the liquid in the open lower reservoir through the lifting line arrangement towards the upper reservoir and/or for pumping the liquid in the upper reservoir thorugh the lowering line arrangement towards the pressure converter.

2. The lifting device according to claim 1, wherein the pressure converter is configured to continuously convert the liquid pressure in the lowering line arrangement into the liquid pressure in the lifting line arrangement.

3. The lifting device according to claim 1, wherein the pressure converter comprises:
   two hollow bodies; and
   two piston members, each being movable within a respective hollow body in order to sealingly divide each hollow body into two chambers of variable volumes; wherein the actuating member is configured to translate a movement of one piston member to a movement of the other piston member.

4. The lifting device according to claim 3, wherein the two hollow bodies are constituted by a tubular member with a partition wall.

5. The lifting device according to claim 3, further comprising an inlet three-way valve in the lowering line arrangement configured to alternatingly supply the liquid in the upper reservoir from the upper reservoir into the chambers of one hollow body.

6. The lifting device according to claim 3, further comprising an outlet three-way valve in the lowering line arrangement below the pressure converter configured to alternatingly drain liquid from the chambers of one hollow body to the lower reservoir.

7. The lifting device according to claim 5, wherein the outlet three-way valve is configured to drain liquid from a chamber to which liquid is not currently supplied by the inlet three-way valve.

8. The lifting device according to claim 3, wherein the lifting line arrangement further comprises an inlet and an outlet associated with each chamber of one hollow body and a one-way valve associated with each inlet and outlet.

9. The lifting device according to claim 3, wherein the actuating member is constituted by a piston rod interconnecting the two piston members.

10. The lifting device according to claim 3, wherein the pump member is integrated with the pressure converter and configured to pump liquid by driving the actuating member.

11. The lifting device according to claim 9, wherein the pump member comprises a drive mechanism configured to reciprocally drive the piston rod.

12. The lifting device according to claim 1, wherein the pump member is arranged in the lifting line arrangement between the pressure converter and the upper reservoir.

13. The lifting device according to claim 1, wherein the pump member is a volumetric pump, such as a lobe pump.

14. A system comprising the lifting device according to claim 1, the upper reservoir and the lower reservoir.

15. The system according to claim 14, wherein the upper reservoir is closed to the surrounding atmosphere.

16. The system according to claim 15, wherein the upper reservoir is configured to store pressure energy in the liquid in the upper reservoir.

17. A system comprising the lifting device according to claim 1, a heat exchanger and the lower reservoir.

18. A system comprising the lifting device according to claim 1 and the upper reservoir.

19. A system comprising the lifting device according to claim 1 and the lower reservoir.

20. A system comprising the lifting device according to claim 1 and a heat exchanger.

* * * * *